United States Patent
Kane (10) Patent No.: US 12,131,415 B1
(45) Date of Patent: Oct. 29, 2024

(54) SYSTEMS AND METHODS FOR AUTOMATIC ATTRIBUTION OF ANIMATION PHYSICS TO POINT CLOUDS

(71) Applicant: Illuscio, Inc., Culver City, CA (US)

(72) Inventor: Luke Kane, Culver City, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/627,967

(22) Filed: Apr. 5, 2024

(51) Int. Cl.
 *G06T 13/20* (2011.01)
 *G06T 7/20* (2017.01)
 *G06T 17/00* (2006.01)
 *G06V 10/764* (2022.01)
 *G06V 20/70* (2022.01)

(52) U.S. Cl.
 CPC ............. *G06T 13/20* (2013.01); *G06T 7/20* (2013.01); *G06T 17/00* (2013.01); *G06V 10/764* (2022.01); *G06V 20/70* (2022.01); *G06T 2210/21* (2013.01)

(58) Field of Classification Search
 CPC .......... G06F 3/011; G06F 16/48; G06F 3/017; G06F 3/04815; G06T 7/20; G06T 13/40; G06T 13/00; G06T 17/00; G06T 19/00; G06T 2210/28; G06T 2210/21; G06T 2210/56; G06V 20/70
 See application file for complete search history.

(56) References Cited

U.S. PATENT DOCUMENTS

| | | | |
|---|---|---|---|
| 11,386,610 B1* | 7/2022 | Bogacz | G06T 15/20 |
| 11,461,987 B1* | 10/2022 | Monaghan | G06T 19/20 |
| 2010/0261526 A1* | 10/2010 | Anderson | G06F 3/016 |
| | | | 345/157 |

* cited by examiner

*Primary Examiner* — Hau H Nguyen
(74) *Attorney, Agent, or Firm* — Ansari Katiraei LLP; Arman Katiraei; Sadiq Ansari (57) ABSTRACT

A three-dimensional (3D) animation system automatically assigns accurate animation physics to points of a point cloud to realistically simulate motion of the points in response to different applied forces. The 3D animation system receives the points that are defined with positions in a 3D space and with visual characteristics. The 3D animation system analyzes one or more of the positions and the visual characteristics of the points, classifies the points based on a commonality in the positions or the visual characteristics of the points being associated with a particular classification, and maps a set of animation physics that is defined for the particular classification to the points. The 3D animation system may then animate the points based on the set of animation physics generating an effect in response to a force that is applied to the points.

20 Claims, 9 Drawing Sheets

SYSTEMS AND METHODS FOR AUTOMATIC ATTRIBUTION OF ANIMATION PHYSICS TO POINT CLOUDS

BACKGROUND

Animation of three-dimensional (3D) models lack realism when real-world physics are not accounted for. The physics change how different 3D models react or move in response to an application of force or when the 3D model interact (e.g., collide, deflect, bounce, slide, push, crash, and/or otherwise move relative to one another at a point of contact) with one another. For instance, a first spherical 3D model representing a solid sports ball (e.g., bowling ball, baseball, croquet ball, billiard ball, etc.) and a second spherical 3D model representing an air-filled sports ball (e.g., basketball, tennis ball, soccer ball, etc.) are animated incorrectly if they bounce, deflect, or otherwise move in the same manner when interacting with another object or receive a same force.

The manual definition of animation physics for complex and even simple 3D models is extremely time-consuming, subject to unrealistic motion due to human error, and/or unintuitive for many users that are not trained or are unfamiliar with the various methods and parameters required to define the animation physics. Accordingly, there is need to automatically define accurate animation physics for a 3D model or different features of a 3D model and/or provide a tool for simple and intuitive definition of the animation physics.

DETAILED DESCRIPTION OF PREFERRED EMBODIMENTS

The following detailed description refers to the accompanying drawings. The same reference numbers in different drawings may identify the same or similar elements.

Disclosed are systems and associated methods for automatically defining and attributing animation physics to three-dimensional (3D) models that are formed by points a point cloud. The animation physics defined for a set of points control the manner with which the set of points move in response to an application of force onto the set of points or the set of points contacting or otherwise interacting with other animated points or objects in a 3D space or as part of a defined animation.

Automatically defining and attributing the animation physics may include automatically configuring values that specify the amount of force required to displace the set of points, the rate of acceleration, the velocity, and/or the amount of displacement in response to an applied force, the shape of the resulting displacement (e.g., bending, curving, shattering, collectively moving without distortion, etc.), the direction of displacement, the amount of force that is lost or transferred onto the set of points or other points coming into contact with the set of points, and/or other characteristics associated with movement, animation, or collision based on the feature that is represented by the set of points or the positional and visual properties of the set of points. The configured values for the animation physics are automatically assigned to the set of points without a user manually selecting the set of points and/or setting the values for the animation physics.

In some embodiments, a 3D animation system may use artificial intelligence and/or machine learning (AI/ML) techniques to analyze the points of a point cloud, determine a classification for a set of points based on the analysis, and automatically define the animation physics for the set of points based on the animation physics that are associated with the determined classification for that set of points. For instance, the 3D animation system may analyze the density, distribution, colors, and/or other properties of the points in different regions of a point cloud, and may determine that the density, distribution, and colors of a first set of points represent a first object or feature that is associated with a first set of animation physics, and that the density, distribution, and colors of a second set of points represent a second object or feature that is associated with a different second set of animation physics. The 3D animation system may map the first set of animation physics to the first set of points so that the first set of points move or are animated according to the first set of animation physics in response to an application of a force on the first set of points or the first set of points interacting with another object. Similarly, the 3D animation system may map the second set of animation physics to the second set of points so that the second set of points move or are animated differently than the first set of points if the same force applied to the first set of points is applied to the second set of points or the second set of points interact in the same manner as the first set of points with the other object.

In some embodiments, the 3D animation system provides one or more tools for users to visualize, attribute, and/or customize the animation physics for different sets of points. For instance, the 3D animation system may visually differentiate points that are defined with different animation physics using different coloring, highlighting, or other effects. The 3D animation system may provide a tool with intuitive configurable parameters for customizing or rapidly defining the animation physics for a set of points. The intuitive configurable parameters may include specifying a weight, rigidity, strength, flexibility, and/or other physical characteristics that the 3D animation system converts to animation physics (e.g., a spring force coefficient, a friction coefficient, energy loss coefficient, etc.) in order to recreate the expected movement of an object with the specified physical characteristics. The configured tool may be used to select a set of points in the point cloud and the 3D animation system may attribute the converted animation physics for the specified physical characteristics to the selected set of points.

To simplify the animation physics customization or definition, the configured tool may automatically expand beyond the selected set of points and may attribute the animation physics to other points outside the selected set of points that share commonality with the selected set of points. For instance, the selected set of points may be in the foreground, a particular plane, or at a depth closest to the tool. The tool applies the animation physics the selected set of points and to unselected surrounding points or other points in the background and/or planes or depths behind the selected plane or depth that have a common density, structural pattern, color similarity, and/or other commonality with the selected set of points and therefore represent points of a common feature or object that should be animated in the same manner as the selected set of points. In this manner, the tool may be used to automatically define animation physics for a set of points without the user selecting each point in the set of points with the interactive tool or other manual means.

Figure 1:
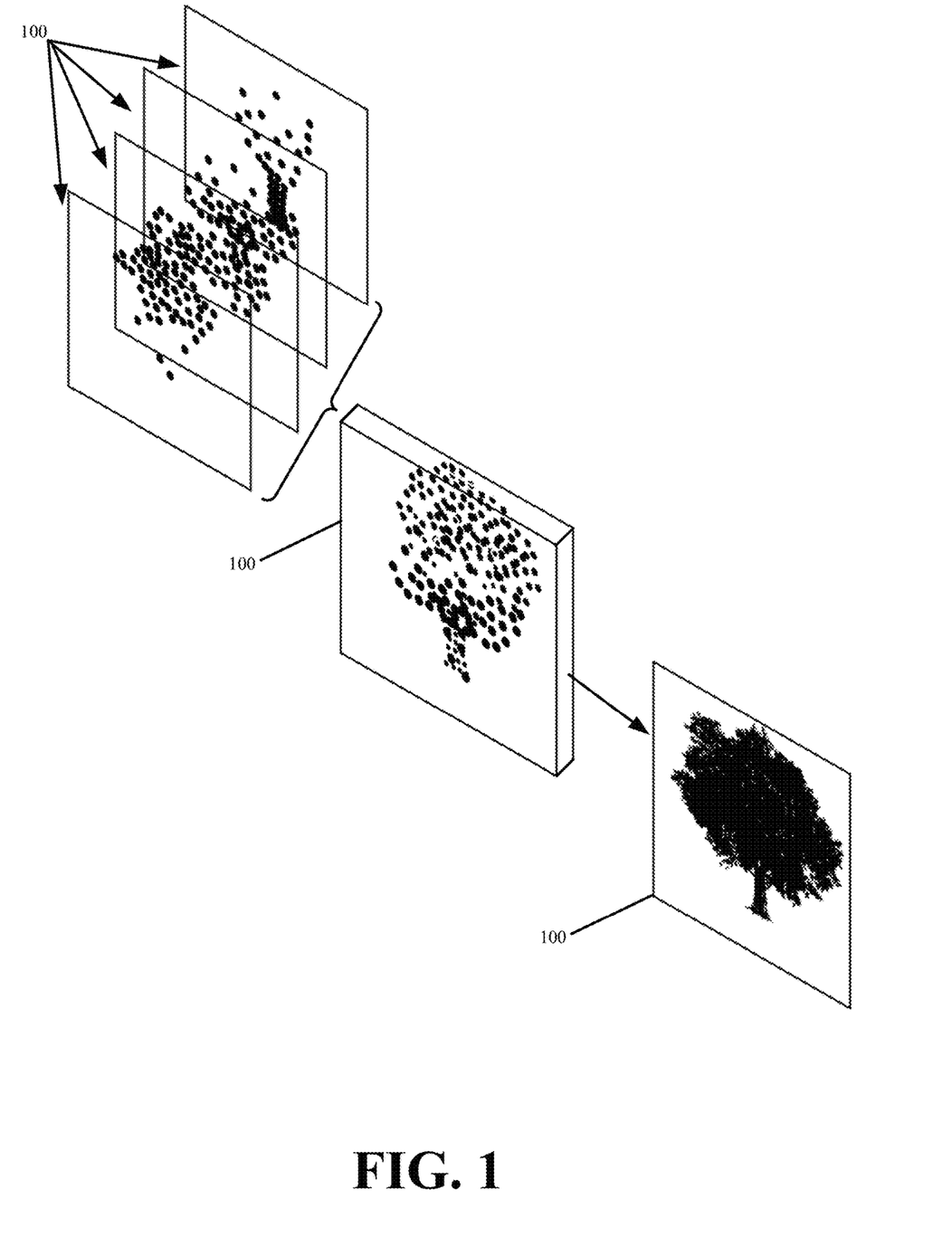
FIG. 1 illustrates an example point cloud in accordance with some embodiments presented herein.

FIG. 1 illustrates an example point cloud 100 in accordance with some embodiments presented herein. Point cloud 100 may represent a 3D object or a 3D scene with primitives that correspond to points distributed in a 3D space. The primitives or points collectively generate the shape and visual characteristics of the represented 3D object or the 3D scene.

The points of point cloud 100 differ from pixels of a 2D image because certain regions of point cloud 100 may have no points, lower densities of points, and/or higher densities of points based on varying amounts of visual information that is defined, detected, or scanned at those regions. Additionally, the position of the point cloud points may be defined in 3D space using x, y, and z coordinate values. In contrast, pixels of a 2D image are defined in 2D space and have a uniform density or fixed arrangement that is defined by the resolution of the 2D image. In other words, the point cloud points may have a non-uniform placement or positioning, whereas the 2D image may have pixel data for each pixel of a defined resolution (e.g., 640×480, 800×600, etc.).

The points of point cloud 100 also differ from meshes or polygons of a 3D mesh model in that the points are disconnected from one another whereas the meshes or polygons are connected in order to create the shape or form of a represented 3D object. Moreover, the meshes or polygons may be stretched or skewed to change the overall shape of the represented 3D object, whereas the points are typically of a fixed size and/or shape.

Each point cloud point may be defined with a plurality of elements. The plurality of elements may include a first set of positional elements and a second set of non-positional or descriptive elements.

The positional elements may be defined with coordinates in a 3D space. For instance, each point cloud point may include x-coordinate, y-coordinate, and z-coordinate elements to capture the position of an imaged surface, feature, or article of the 3D object or the 3D scene in the 3D space.

The positional elements may also include a surface normal. The surface normal defines the angle, direction, or orientation that the surface, feature, or article of the 3D object or the 3D scene represented by the point cloud point faces or is exposed to. More specifically, the surface normal for a particular point is a line, ray, or vector that is perpendicular to the surface, feature, or article represented by that particular point.

The non-positional elements may include information about the detected characteristics of the surface, feature, or article imaged at a corresponding position in the 3D space. The characteristics may correspond to a detected color. The color may be represented using red, green, blue (RGB), and/or other values. In some embodiments, the characteristics may provide the chrominance, hardness, translucence, reflectivity, luminance, metallic characteristics, roughness, specular, diffuse, albedo, index of refraction (IOR), and/or other properties of the imaged surface, feature, or article. In some embodiments, the non-positional elements may directly identify a material property or other classification for a point. For instance, a first point may be defined with a non-positional element with a value that identifies the material property of "aluminum", a second point may be defined with a non-positional element with a value that identifies the material property of "steel", and a third point may be defined with a non-positional element with a value that identifies the material property of "plastic".

In some embodiments, the characteristics may be related to properties of the device used to generate each of the points. For instance, the characteristics may include a Tesla strength value to quantify the strength of the magnetic field that was used in detecting and/or imaging the surface, feature, or article represented by a particular point cloud point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding point in the 3D space.

Accordingly, each point cloud point may include or may be defined with an array of elements. The array of elements may provide the positioning of the point in the 3D space as well as one or more visual characteristics of that point. For instance, a point cloud point may be stored and/or represented as an array of elements with some combination of x-coordinate, y-coordinate, z-coordinate, red, green, blue, chrominance, hardness, translucence, reflectivity, luminance, metallic characteristics, roughness, specular, diffuse, albedo, IOR, tesla, and/or other non-positional values.

Point cloud 100 and the individual points of point cloud 100 may be generated by a 3D or depth-sensing camera, Light Detection and Ranging (LiDAR) sensor, Magnetic Resonance Imaging (MRI) device, Positron Emission Tomography (PET) scanning device, Computerized Tomography (CT) scanning device, time-of-flight device, and/or other imaging equipment for 3D objects, volumetric objects, or 3D environments. Point cloud 100 may be generated from output of two or more devices. For instance, a first imaging device (e.g., a LiDAR sensor) may determine the position for each point in the 3D space, and a second imaging device (e.g., a high-resolution camera) may measure or capture the characteristics or other non-positional information for each point. One or more photogrammetry techniques may be used to consolidate the data from the first imaging device and the second imaging device, and to create point cloud 100. Point cloud 100 and the individual points of point cloud 100 may also be digitally created by a graphics artist or other user.

Figure 2:
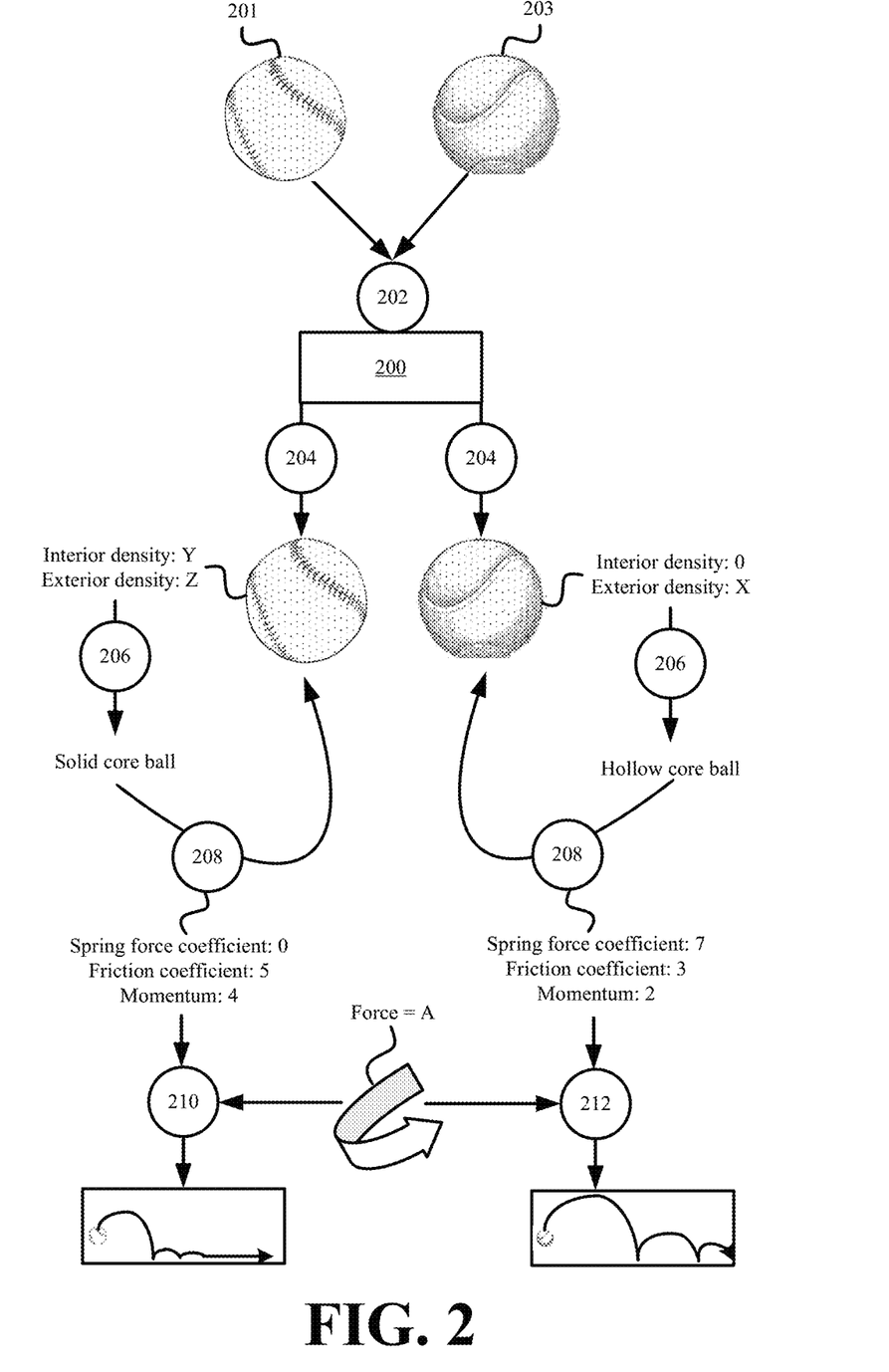
FIG. 2 illustrates an example of automatically defining animation physics for points of different point clouds in accordance with some embodiments presented herein.

FIG. 2 illustrates an example of automatically defining animation physics for points of different point clouds in accordance with some embodiments presented herein. 3D animation system 200 receives (at 202) first point cloud 201 and second point cloud 203 that represent different 3D objects having similar spherical shapes. For instance, first point cloud 201 and second point cloud 203 may represent balls for different games or sports that move or react to forces differently.

3D animation system 200 analyzes (at 204) the points of each point cloud 201 and 203. In some embodiments, 3D animation system 200 analyzes (at 204) the density with which the points are distributed in the 3D space of each point cloud 201 and 203. In some embodiments, 3D animation system 200 analyzes (at 204) the structural arrangement, pattern, distribution, or positioning of the points. In some embodiments, 3D animation system 200 analyzes (at 204) the points for color commonality.

3D animation system 200 classifies (at 206) first point cloud 201 as a solid and/or rigid object based on the analysis (at 204). Similarly, 3D animation system 200 classifies (at 206) second point cloud 203 as a hollow, air-filled, and/or bouncy object based on the analysis (at 204). For instance, the points of first point cloud 201 may have a greater density than the points of second point cloud 203 to represent a more rigid or hard object than second point cloud 203. Moreover, first point cloud 201 may have points defined within its interior or the density of first point cloud 201 may remain across the 3D space to indicate a solid core, whereas second point cloud 203 may have no or few points defined within its interior or the density of second point cloud 203 may change from an exterior to an interior of the 3D space to indicate that the center or core of second point cloud 203 is hollow, empty, or less dense.

In some embodiments, 3D animation system 200 performs an exact classification (at 206) for first point cloud 201 and second point cloud 203 based on the analysis (at 204). For instance, the density, point distribution, and/or first color commonality of first point cloud 201 may match to properties of a baseball, and the different density, point distribution, and/or second color commonality of second point cloud 203 may match to properties of a tennis ball. Accordingly, classifying (at 206) first point cloud 201 may include tagging first point cloud 201 with a baseball identifier or a solid core ball identifier, and tagging second point cloud 203 with a tennis ball or a hollow bouncing ball identifier.

3D animation system 200 attributes (at 208) first animation physics to the points of first point cloud 201 based on the first animation physics being defined for or associated with the first classification, and second animation physics to the points of second point cloud 203 based on the second animation physics being defined for or associated with the second classification. For instance, the first animation physics may specify or replicate the manner with which a baseball, billiard ball, or other solid core ball reacts or moves in response to a force or contact with another object, and the second animation physics may specify or replicate the manner with which a tennis ball, basketball, soccer ball, or other hollow bouncing ball reacts or moves in response to a force or contact with another object. The first animation physics may specify zero elasticity or no spring force for the points of first point cloud 201, a greater first amount of force for moving the points of first point cloud 201 (e.g., the friction coefficient), and a greater first amount of momentum associated with the movement of the first point cloud 201 points (e.g., for moving through or past another object in the path or the specified direction of movement for the points of first point cloud 201). The second animation physics may specify a large amount of elasticity or a large spring force coefficient that causes the points of second point cloud 203 to flex or bend in response to a force and to bounce or reflect off another contacted object or surface, a lesser second amount of force for moving the points of second point cloud 203 (e.g., the friction coefficient), and a lesser second amount of momentum associated with the movement of the second point cloud 203 points. The first and second animation physics may be defined with other values to simulate or replicate how the points of each point cloud 201 and 203 distort or move how fast the points accelerate, the amount of force or energy that is transferred, absorbed, or lost, and/or other real-world physics associated with the movement of objects in response to different applied forces.

Attributing (at 208) the first animation physics and the second animation physics may include defining new non-positional elements for the points of first point cloud 201 to represent the first animation physics and the values associated with the first animation physics, and defining the same or similar non-positional elements for the points of second point cloud 203 but with different values for the second animation physics. In some embodiments, 3D animation system 200 defines a spring force coefficient (e.g., elasticity), a friction coefficient, a momentum, an energy transfer and/or energy loss coefficient, drag coefficient, and/or other properties for modeling the movement and/or physics associated with the classified (at 206) object represented by each point cloud 201 and 203.

3D animation system 200 animates (at 210) first point cloud 201 with a first motion that is generated from a particular force being applied on first point cloud 201 and the first animation physics that are automatically attributed (at 208) to the points of first point cloud 201. 3D animation system 200 animates (at 212) second point cloud 203 with a different second motion that is generated from the same particular force being applied on second point cloud 203 and the second animation physics that are automatically attributed (at 208) to the points of second point cloud 203. Specifically, 3D animation system 200 computes the acceleration, trajectory, distortions, and/or movements for the points of each point cloud 201 and 203 based on the effects that the different animation physics have on the particular force.

3D animation system 200 may generate complex animations based on the interaction or collision between one or more objects represented by different point clouds or points that are defined with different animation physics. For instance, a user may position first point cloud 201 and second point cloud 203 in a common 3D space, and may place a force that causes first point cloud 201 to move towards second point cloud 203. 3D animation system 200 computes the amount of energy or force that is transferred to the points of first point cloud 201 in order to realistically simulate the speed at which first point cloud 201 moves towards second point cloud 203. Upon detecting that the points of first point cloud 201 contact the points of second point cloud 203, 3D animation system 200 computes the effect that the energy or force transferred to the points of first point cloud 201 have on the points of second point cloud 203 based on the different animation physics defined for the points of each point cloud 201 and 203. In this example, first point cloud 201 has greater momentum and mass than second point cloud 203 and no elasticity or spring force. Accordingly, 3D animation system 200 animates first point cloud 201 continuing along its computed trajectory and/or motion path with a reduced velocity due to energy loss resulting from the impact with second point cloud 203, and animates second point cloud 203 as deflecting off first point cloud 201 according to the elasticity or spring force and mass defined for the points of second point cloud 203, and an amount of energy or force that transfers from the points of first point cloud 201 to the points of second point cloud 203.

3D animation system 200 may use one or more AI/ML techniques to improve the accuracy of the classification and improve the modeling of the animation physics associated with each classification. The AI/ML techniques may be used to develop a model that associates unique differentiating characteristics to different classifications and that further associates correct animation physics to each classifications. Consequently, the AI/ML techniques assist in the attribution of more accurate animation physics to points of a point cloud.

Figure 3:
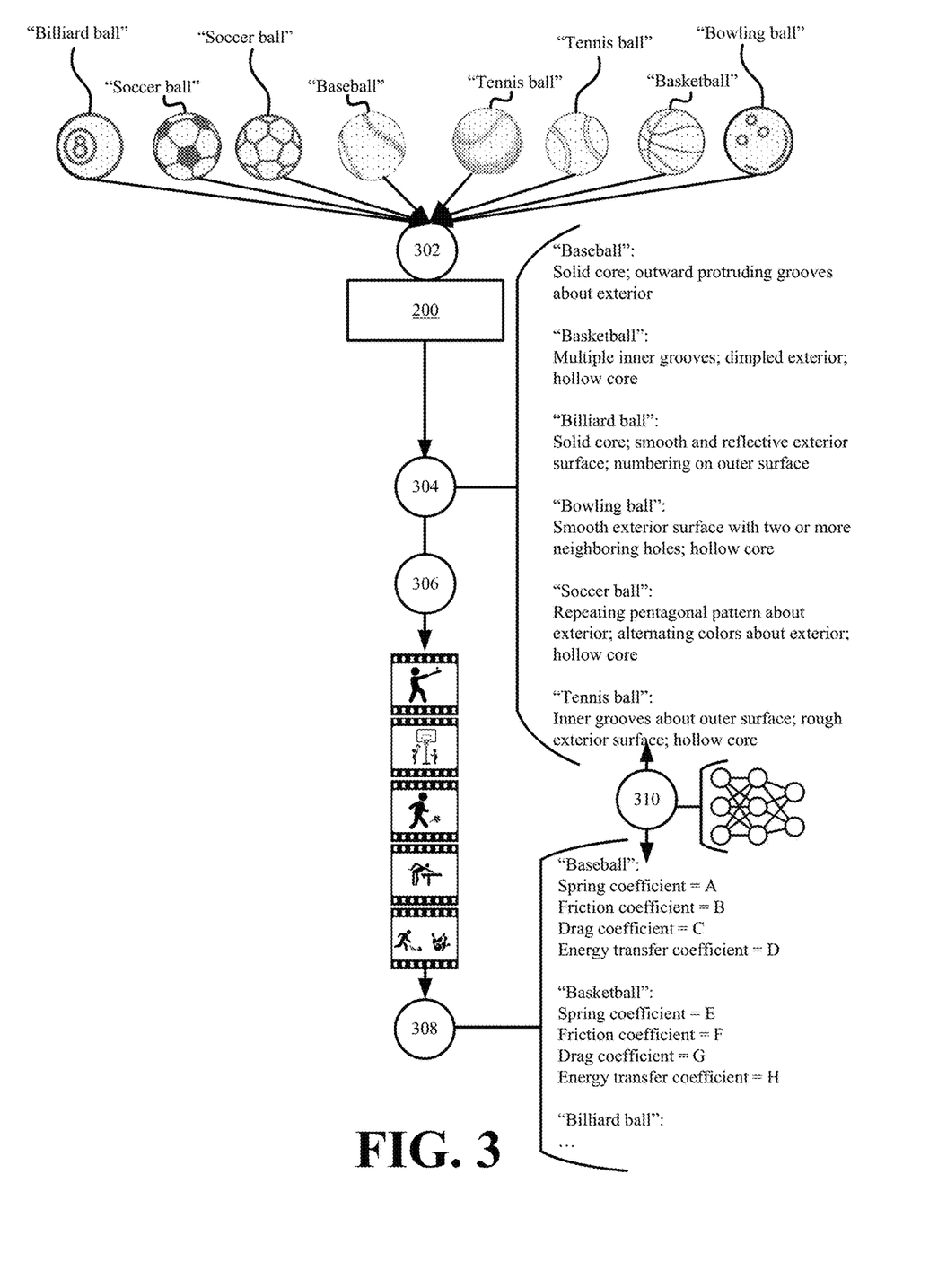
FIG. 3 illustrates an example of training a model for classifying and associating the animation physics for different objects in accordance with some embodiments presented herein.

FIG. 3 illustrates an example of training a model for classifying and associating the animation physics for different objects in accordance with some embodiments presented herein. The model training may be performed in two stages.

The first stage may include training the model for the point or point cloud classification. 3D animation system 200 receives (at 302) a set of point clouds that are labeled to identify the object represented by each point cloud. For instance, 3D animation system 200 receives different example point clouds of bowling balls, basketballs, tennis balls, and/or other balls that are tagged or labeled with one or more identifiers for the represented objects. In some embodiments, the identifiers directly identify the represented object. For instance, the identifiers correspond to values of "bowling ball", "basketball", "tennis ball", etc. In some other embodiments, the identifiers identify properties used to classify the represented object. For instance, the identifies specify that the object represented by the example point cloud is "hard", "soft", "rigid", "flexible", "solid", "hollow", "bouncy", "strong", "weak", "heavy", "light", etc.

3D animation system 200 uses one or more AI/ML techniques to identify unique commonality amongst the points of each example point cloud having the same label or classification and to associate (at 304) that unique commonality to the label or classification. The AI/ML techniques may perform pattern recognition and/or differentiation based on the positions and visual characteristics of the points from the different classified point cloud.

For instance, each of the example point clouds may have a similar spherical shape. The overall shape therefore cannot be used to differentiate between point clouds representing the different balls or spherical shapes. However, the AI/ML analysis may reveal that a bowling ball has a dense outer core, a hollow inner core, and two or more circular holes adjacent to one another about the dense outer core and that none of the other different labeled point clouds have these relationships or commonality. Similarly, the AI/ML analysis may differentiate point clouds representing tennis balls from baseballs by determining that tennis ball point clouds have a less dense outer core than baseball point clouds, have inward extending or convex grooves about the outer core whereas the baseball point clouds have outward protruding or concave grooves about the outer core, have a rough exterior due to the points representing the tennis ball fibers extending non-uniformly from the outer surface, and have different densities about the interior or inner cores. Accordingly, associating the unique commonality to the label or classification includes generating a mapping between the point cloud labels or classifications and the unique positional and non-positional patterns, values or value ranges, and/or other commonality that differentiate point clouds with a specific label or classification from all other point clouds with a different label or classification.

The second stage of the modeling includes training the model to determine and associate the correct animation physics to each label or classification. In some embodiments, the example point clouds used for training the first stage of the model may be defined with animation physics. In some such embodiments, 3D animation system 200 directly maps the animation physics from the example point clouds to the corresponding labels or classifications in the model. For instance, the model may include a first classification for "basketball", unique point densities, distributions, and/or positioning for identifying the first classification in unlabeled point clouds, and first animation physics that are directly defined as part of and mapped from the example point clouds of basketballs. In some other embodiments, the example point clouds may not be defined with animation physics or may include non-animated or static representations of the represented objects. In some such embodiments, 3D animation system 200 determines the animation physics from analyzing videos or animations of each classification or label.

Accordingly, 3D animation systems 200 may retrieve (at 306) videos or animations that show the classified objects in motion, and may provide the retrieved (at 306) videos or animations to the one or more AI/ML techniques for analysis. For the basketball classification or label, 3D animation system 200 may retrieve (at 306) and provide videos or animations of basketballs to one or more AI/ML techniques. The videos or animations need not involve animated point clouds and may include two-dimensional videos or animations of the classified object with different motions (e.g., colliding off of different objects, receiving different forces in different directions or at different positions, etc.).

The AI/ML techniques analyze the videos or animations to track the motion of the classified object in response to different forces. For instance, the AI/ML techniques may track the trajectory of the classified object, may track the velocity or acceleration of the classified object in response to different forces being applied to the classified object, may track how the velocity or acceleration changes in response to colliding or contacting other objects that are associated with different properties (e.g., solid, hollow, heavy, light, etc.), and/or may track distortions or changes to the shape or form of the classified object in response to the different force being applied or the classified object colliding or contacting other objects. Based on the video analysis and the motion tracking, the AI/ML techniques may determine (at 308) the animation physics of the classified object. For instance, the AI/ML techniques may derive values for the elasticity, momentum, mass, friction coefficient, energy absorption, energy transfer, energy loss (e.g., energy that is lost via conversion to heat, light, etc.), fragility (e.g., amount of force to destroy, explode, break, etc. the classified object), acceleration, drag (e.g., air, water, and/or movement through other elements or materials), and/or other properties affecting the motion of the classified object.

3D animation system 200 defines (at 310) the model to include the different classifications (e.g., the labels, tags, or identifiers for the different classifications), point densities, distributions, arrangements, structures, colors, and/or other commonality that is unique to or that differentiates each classification from the other classifications, and the determined animation physics for each classification. Continuing with the ball examples, the model may include different classifications for a "bowling ball", "basketball", "soccer ball", "tennis ball", and "billiard ball", different commonality in point density, distribution, colors, and/or other elements with which to differentiate point clouds representing each classification, and the animation physics that were determined or derived from example videos or animations showing each of the bowling ball, basketball, soccer ball, tennis ball, and billiard ball moving in response to different forces and/or interaction with other objects.

Figure 4:
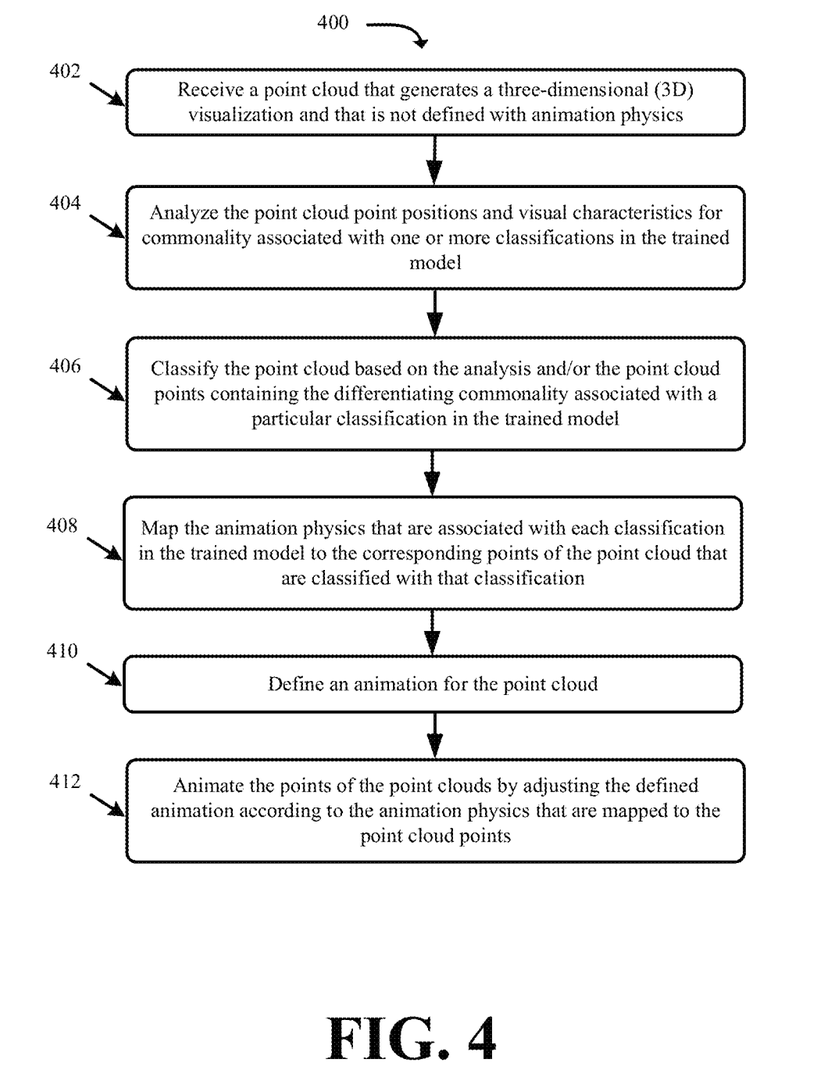
FIG. 4 presents a process for automatically defining animation physics for points of a point cloud in accordance with some embodiments presented herein.

FIG. 4 presents a process 400 for automatically defining animation physics for points of a point cloud in accordance with some embodiments presented herein. Process 400 is implemented by 3D animation system 200.

3D animation system 200 may include one or more devices or machines with processor, memory, storage, network, and/or other hardware resources adapted or configured to generate 3D animations or animations involving point clouds. In some embodiments, 3D animation system 200 is a standalone system with which animators and/or other users generate videos or animations using point clouds, other 3D formats (e.g., mesh models), and other assets. In some other embodiments, 3D animation system 200 is part of a larger system for generating, animating, editing, adding special effects, rendering, and/or otherwise creating videos or animations.

Process 400 includes receiving (at 402) a point cloud that generates a 3D visualization and that is not defined with animation physics. The point cloud generates the 3D visualization based on points that are defined with discrete positions in a 3D space and with colors and other visual characteristics to present at the discrete positions. 3D animation system 200 may receive (at 402) the point cloud in response to the point cloud being selected for insertion or inclusion in a video or animation.

Process 400 includes analyzing (at 404) the point cloud point positions and visual characteristics for commonality associated with one or more classifications in the trained model. The analysis (at 404) may include selecting all the points of the point cloud or sets of points at different regions of the point cloud, and comparing the density, distribution, arrangement, positioning, and/or visual characteristics of the selected points against the commonality that differentiates each classification in the trained model from the other classification.

Process 400 includes classifying (at 406) the point cloud based on the analysis (at 404) and/or the point cloud points containing the differentiating commonality associated with a particular classification in the trained model. In some embodiments, classifying (at 406) the point cloud may include determining that the density, distribution, arrangement, positioning, and/or visual characteristics of the point cloud match by at least a threshold amount (e.g., 80% or more) to the differentiating commonality associated with the particular classification (e.g., "basketball", "baseball", "soccer ball", "tennis ball", etc.). In some embodiments, classifying (at 406) the point cloud may include providing multiple classification tags or labels to the point cloud. For instance, the point cloud may be classified as representing an object that is "solid", "heavy", "sticky", and "inelastic".

In some embodiments, different parts of the point cloud or different sets of points from the point cloud may be classified (at 406) with different tags or labels. For example, a first set of points in a first region of the point cloud may have the density, distribution, and color commonality of a rubber tire, and a second region of the point cloud may have the density, distribution, and color commonality of a metal wheel rim. As another example, a first set of points in a first region of the point cloud may have the density, distribution, and color commonality of glass, and a second region of the point cloud may have the density, distribution, and color commonality of solid frame. In each example, the first and second sets of points represent different objects or features that may react differently to the same force, and therefore should be animated differently. Accordingly, 3D animation system 200 classifies (at 406) different parts or sets of points in the same point cloud with different classifications or identifiers so that the different parts or sets of points may be associated with different animation physics.

In some embodiments, classifying (at 406) the point cloud may include adding one or more classification labels, tags, or identifiers to the point cloud definition, header, or metadata. In some other embodiments, classifying (at 406) the point cloud may include adding the one or more classification labels, tags, or identifiers to the point cloud points. Specifically, the identifiers may be added as new non-positional elements of the points.

Process 400 includes mapping (at 408) the animation physics that are associated with each classification in the trained model to the corresponding points of the point cloud that are classified with that classification. The trained model is defined with the classifications, the point properties or characteristics that uniquely differentiate each classification, and the animation physics that are derived for each classification. Accordingly, the mapping (at 408) includes identifying the points from the point cloud that received a particular classification, and defining the animation physics for the identified points based on the animation physics associated with the particular classification in the trained model.

In some embodiments, 3D animation system 200 maps (at 408) the animation physics from the model to one or more non-positional elements of the points. For instance, the points may include non-positional elements that specify two or more of the spring force coefficient, friction coefficient, drag coefficient (e.g., for movement through air, water, and/or other elements or materials), energy transfer coefficient (e.g., an amount of the applied force that is absorbed, transferred, or lost), strength coefficient (e.g., amount of force to destroy, explode, break, etc. the classified object), acceleration, and/or other properties affecting the motion of the classified object. In some other embodiments, 3D animation system 200 defines a single set of values to represent the animation physics for the entire point cloud rather than redundantly define the same values for each commonly classified point of the point cloud. In still some other embodiments, the mapping (at 408) may include adding a unique index to each point of the point cloud with the unique index mapping (at 408) to a different set of animation physics in the trained model. For instance, an animation physics index value of 1 may map (at 408) to a first set of animation physics defined in the model for a "basketball", and an animation physics index value of 2 may map (at 408) to a second set of animation physics defined in the model for a "baseball". The animation physics index value may correspond directly to the classification tag, label, or identifier that was associated with the point cloud or the point cloud points. For instance, the point cloud or point cloud points with the classification label of "basketball" may map (at 408) to a first set of animation physics defined in the model under the "basketball" classification, and the classification label of "baseball" may map (at 408) to a second set of animation physics defined in the model under the "baseball" classification.

Process 400 includes defining (at 410) an animation for the point cloud. Defining (At 410) the animation may include inserting the point cloud into a larger 3D space with zero or more other objects, and specifying a force or motion to apply to the point cloud or the other objects in the larger 3D space. For instance, an animator may define a throwing motion that applies a specified force with a particular trajectory and/or acceleration on the object represented by the point cloud. Alternatively, the animator may define a motion for another object in the larger 3D space that causes the other object to contact or collide with the points of the point cloud at some time in the animation.

Process 400 includes animating (at 412) the points of the point clouds by adjusting the defined (at 410) animation according to the animation physics that are mapped (at 408) to the point cloud points. The animation physics realistically simulate the effect that the defined (at 410) animation or the applied force has on the points of the point cloud by accounting for the physics associated with moving and movement of the object represented by the point cloud. In other words, rather than animate different point clouds the same in response to the same force being applied to the different point clouds, 3D animation system 200 adjusts the impact that the force has on the points based on the animation physics that are mapped to the points. For instance, 3D animation system 200 may compute based on the animation physics the amount of force that is required to put the point cloud in motion (e.g., overcome static friction), the amount of force that is required to cause the point cloud to explode, shatter, bend, or distort, the amount by which the points of the point cloud flex or move in response to the force, the amount of the force that is absorbed or transferred to the points, the rate at which the point cloud points accelerate in response to a force, the trajectory or direction in which the point cloud points move in response to an application of force at a particular position or direction, and/or other factors that affect the movement of the point cloud points when receiving a force or colliding with another object that has the same or different animation physics.

Figure 5:
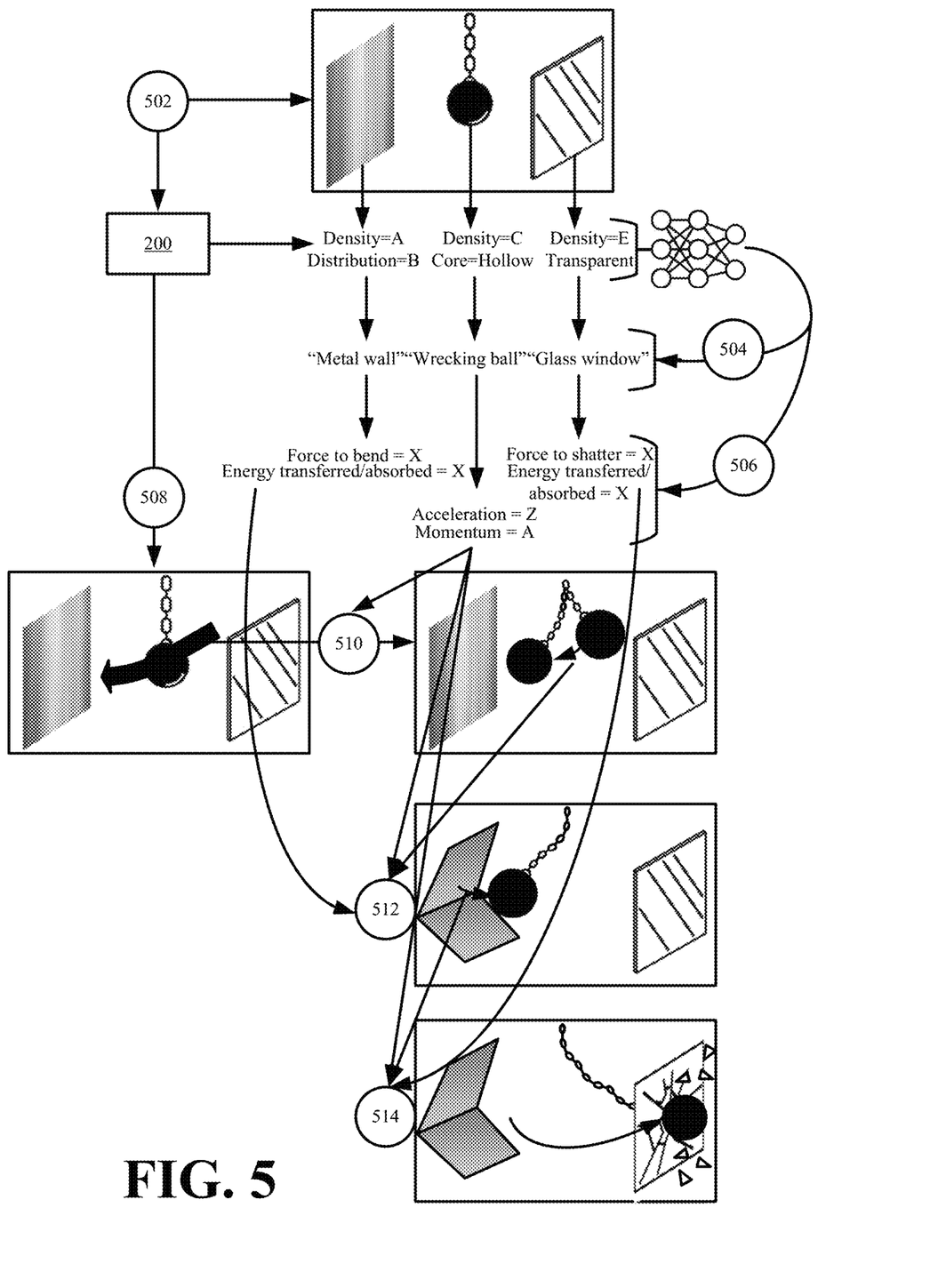
FIG. 5 illustrates an example of animating point clouds based on automatically defined animation physics for the points of the point cloud in accordance with some embodiments presented herein.

FIG. 5 illustrates an example of animating point clouds based on automatically defined animation physics for the points of the point cloud in accordance with some embodiments presented herein. A user selects and places (at 502) three different point clouds in a 3D space as part of defining an animation. The point clouds include a wrecking ball, a metal wall, and a glass window.

3D animation system 200 classifies (at 504) the object represented in each point cloud based on the unique differentiating properties associated with the points of each point cloud and/or the point positional and visual characteristic properties matching the differentiating commonality associated with each classification in the trained model. For instance, the wrecking ball point cloud has the most dense arrangement of points in a spherical pattern with a solid core, the metal wall point cloud has the second most dense arrangement of points in a thin planar distribution that matches the distribution associated with metal, and the glass window point cloud has the most sparse arrangement of points with visual characteristics indicating that the points are transparent or clear. Based on these differentiating characteristics, 3D animation system 200 provides the correct classification to each point cloud.

3D animation system 200 automatically associates (at 506) different animation physics to each point cloud based on the different classification (at 504) that is determined for each point cloud. The automatic association (at 506) of the animation physics may include mapping the animation physics that were previously modeled or derived for each classification to the point cloud points receiving those classifications.

3D animation system 200 receives (at 508) an animation that is defined for the wrecking ball point cloud. The animation involves swinging or moving the wrecking ball towards the metal wall point cloud from a first position with a first force.

3D animation system 200 generates (at 510) a first part of the animation by applying the first force from the first position to the points of the wrecking ball point cloud. The first part of the animation involves moving the points of the wrecking ball point cloud in the direction of the first force according to an acceleration that is determined by adjusting the first force according to the first animation physics defined for the points of the wrecking ball point cloud. For instance, 3D animation system 200 computes the acceleration based on the first force divided by the mass associated with the wrecking ball point cloud and further computes the momentum or amount of force that is transferred or contained by the animated points of the wrecking ball point cloud.

3D animation system 200 generates (at 512) a second part of the animation based on a second amount of force that is transferred from the wrecking ball point cloud to the points of the metal wall point cloud as determined from the animation physics associated with the points of the two point clouds coming into contact or occupying the same position in 3D space. Specifically, 3D animation system 200 determines that a second amount of force is transferred from the wrecking ball point cloud to the metal wall point cloud, and that the animation physics associated with the metal wall point cloud cause the points of the metal wall point cloud to bend inwards in response to the second amount of force. Moreover, 3D animation system 200 determines that the shape of the wrecking ball point cloud is not distorted as a result of colliding with the metal wall point cloud. 3D animation system 200 deflects the wrecking ball point cloud off the metal wall point cloud after determining that a remaining third amount of force is insufficient to penetrate through the metal wall point cloud and the animation physics of the metal wall point cloud stop the initial motion of the wrecking ball point cloud. Accordingly, 3D animation system 200 animates the wrecking ball point cloud moving in the opposite direction with an acceleration derived from the remaining third amount of force and the animation physics of the wrecking ball point cloud.

3D animation system 200 generates (at 514) a third part of the animation based on the third amount of force with which the wrecking ball point cloud transfers to the points of the glass window point cloud. 3D animation system 200 determines from the animation physics associated with the glass window point cloud points that the third amount of force is sufficient to cause a shattering or breaking effect and that the animation physics associated with the glass window point cloud points are insufficient to halt the movement of the wrecking ball point cloud. Accordingly, 3D animation system 200 animates the shattering of the glass window point cloud and the wrecking ball point cloud moving past the position of the glass window point cloud points. The speed and distance with which the points of the glass window point cloud move away from one another is determined by the animation physics associated with those points and the third amount of force. Similarly, any change in the acceleration or velocity for the wrecking ball point cloud points is determined based on the amount of third force that is lost upon colliding with the glass window point cloud points and the animation physics associated with those points.

An animator may wish to adjust the automatically defined animation physics for a set of points or may wish to rapidly define and associate animation physics to a set of points in a point cloud. In some embodiments, 3D animation system 200 provides various user interface (UI) tools with which the animation may identify, define, and/or change the animation physics for points of a point cloud.

Figure 6:
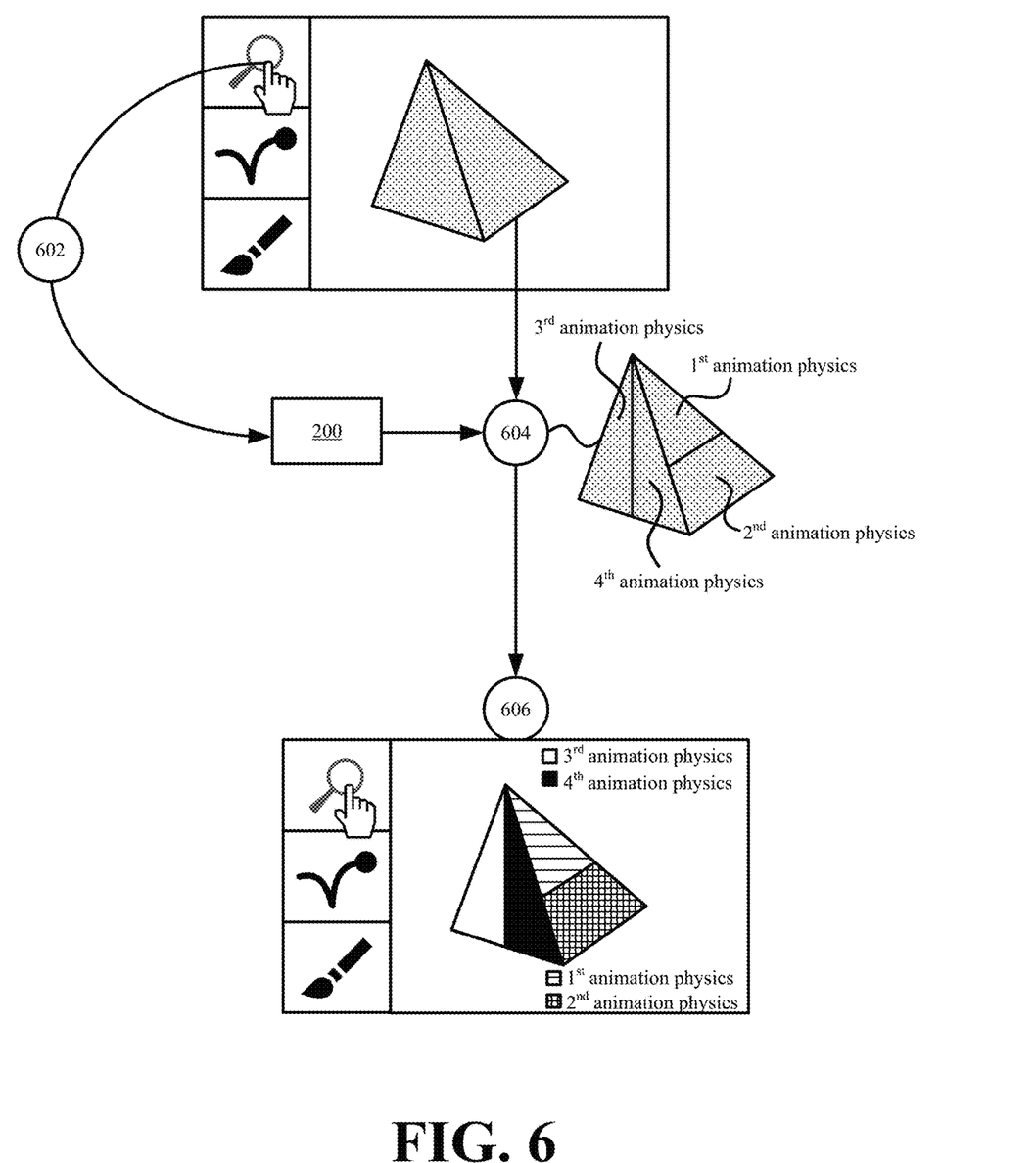
FIG. 6 presents a user interface (UI) tool for visualizing the animation physics defined for different parts of a point cloud in accordance with some embodiments presented herein.

FIG. 6 presents a UI tool for visualizing the animation physics defined for different parts of a point cloud in accordance with some embodiments presented herein. The UI tool may be activated for a point cloud with automatically defined, manually defined, or manually adjusted animation physics.

3D animation system 200 detects (at 602) activation of the UI tool for visualizing the animation physics. For instance, 3D animation system 200 may present a UI with a display window for viewing a 3D rendering of the point cloud and with a set of selectable UI element for activating different UI functionality including the animation physics visualization.

3D animation system 200 analyzes (at 604) the animation physics defined for the point cloud points. The analysis includes identifying sets of points that are defined with the same or similar animation physics (e.g., values for the animation physics that differ by less than a threshold amount).

3D animation system 200 changes (at 606) the visualization of the points by color coding the points based on the animation physics defined for those points. In other words, 3D animation system 200 maps the different animation physics to different colors, and presents the points in the display window at their defined positions with colors determined from the animation physics mapping. In some embodiments, changing (at 606) the visualization includes presenting the points with their defined visual characteristics and overlaying the color coded representations over the points.

The color coding may be defined according to a legend. For instance, points that require a lot of force to move may be presented with a red color, and points that require little force to move may be presented with a green color. Similarly, points that are elastic and/or flex in response to an application of force may be presented with a light gray color and points that are inelastic and do not flex in response to an application of force may be presented a dark gray color. Other colors or color variations may be used to present different friction coefficients, drag coefficients, momentum, energy coefficients, mass, and/or other animation physics.

As the user selects or interacts with a set of points or individual points presented with a particular color coding, 3D animation system 200 may update the UI to present the values for the animation physics represented by the particular color coding. The UI allows the user to quickly identify the different animation physics that may be associated with different parts or points of a point cloud, and make adjustments where necessary without having to manually select the different parts or points of the point cloud. For instance, a point cloud may be a 3D representation of a car with a first set of animation physics associated with the car wheels and tires, a second set of animation physics associated with the car body panels, and a third set of animation physics associated with the car windows and windshield. Each of the different set of animation physics may be presented with a different color in the UI so that the user may readily identify which animation physics are associated with which points or parts of the 3D representation.

In some embodiments, 3D animation system 200 provides a UI tool for intuitively and rapidly defining or adjusting animation physics for different points of a point cloud. For instance, a user may not know the spring coefficient, friction coefficient, energy transfer and/or loss coefficient, and/or other configurable values that would create the desired animation physics for an object. However, the user may know how much the object weighs, whether it is hollow or solid, sticky or smooth, flexible or inflexible, strong or weak, breakable or unbreakable, and/or other physical characteristics of the object. Accordingly, the UI tool may allow the user to define and apply physical characteristics to the point cloud points, and 3D animation system 200 may automatically convert or map the physical characteristic to the values for the animation physics that generate animations consistent with the physical characteristics.

Figure 7:
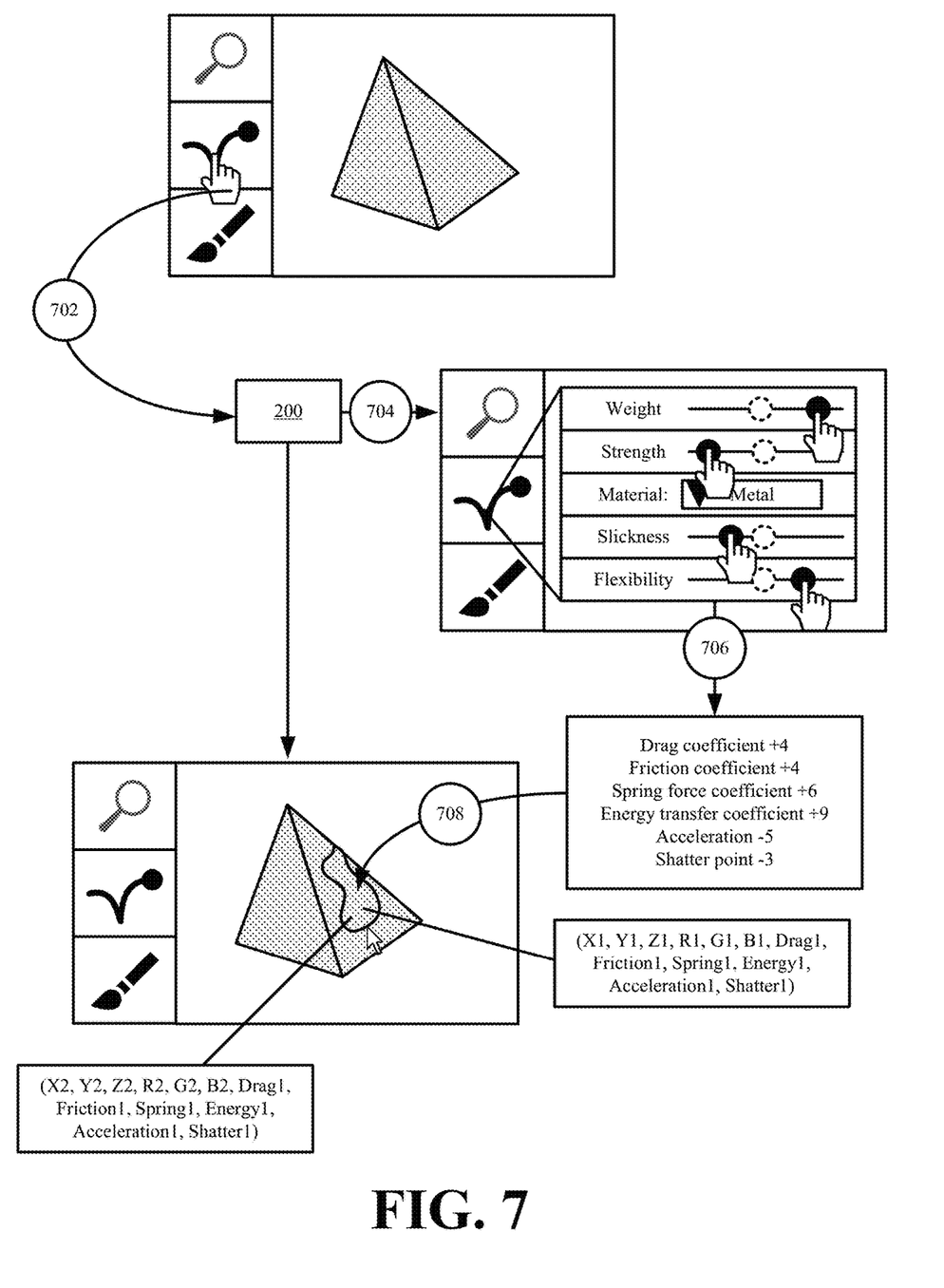
FIG. 7 illustrates an example of using the UI tool to intuitively and rapidly define or adjust animation physics for points of a point cloud in accordance with some embodiments presented herein.

FIG. 7 illustrates an example of using the UI tool to intuitively and rapidly define or adjust animation physics for points of a point cloud in accordance with some embodiments presented herein. 3D animation system 200 detects (at 702) the activation of the UI tool in response to a user input that selects an icon or other selectable UI element associated with the UI tool from the UI.

3D animation system 200 presents (at 704) a set of configurable physical parameters for intuitively defining the animation physics for the points of a presented point cloud. The set of configurable physical parameters may include one or more of a first parameter for setting the weight or mass of the object represented by the point cloud, a second parameter for defining the object strength, rigidity, or thickness, a third parameter for setting the material that the object is made of (e.g., metal, wood, plastic, glass, etc.), a fourth parameter for setting the slickness or stickiness of the object, a fifth parameter for setting the flexibility of the object. Each parameter may be defined using intuitive values (e.g., an exact weight) or with a slider that provides for a range of values. In some embodiments, the parameters may be directly associated with certain animation physics. For instance, each of the different material settings may be associated with different values for the friction coefficient, spring coefficient, and the drag coefficient.

3D animation system 200 converts (at 706) the values configured for the set of configurable physical parameters into values for animation physics that produce the desired results. For instance, a slickness value may be converted to a first friction coefficient value and a stickiness value may be converted to a second friction coefficient value. Similarly, the flexibility set of the object may be mapped to a spring force coefficient value.

3D animation system 200 tracks the UI tool positioning over points of the point cloud and assigns (at 708) the converted animation physics values to any points that are selected with the UI tool while the UI tool is activated (e.g., pressing and holding of left mouse button). In some embodiments, the user may select a set of points by moving the UI tool around the points and may activate the UI tool once the selection is complete. In some other embodiments, the user may activate the UI tool with a specific user input and may move the UI tool over the points that are to receive the converted animation physics values.

In this manner, the UI tool may be used to quick set the animation physics for groups of points in the point cloud without having to manually select each point and set the animation physics values for the selected point one-by-one. Instead, the user may define the animation physics intuitively based on desired physical characteristics to attribute to the points and in a similar manner as using a paintbrush tool to change the coloring of the points.

In some embodiments, 3D animation system 200 enhances the functionality of the UI tool for adjusting or defining the animation physics by expanding the user selection to include related points that are not in the user selection but that belong to the same feature as the points in the user selection. For instance, a point cloud may have millions of points that are densely distributed in a 3D space and that positioned are in different planes or depths. It may be difficult for a user to select all the points of a particular feature that should be assigned the same animation physics using a two-dimensional input device (e.g., a mouse). 3D animation system 200 may detect commonality between the points in the user selection, may expand the user selection to include points outside the user selection that have the same commonality, and may attribute the animation physics defined for the UI tool to the points in the user selection and the points outside the user selection that share the same commonality as the points in the user selection.

Figure 8:
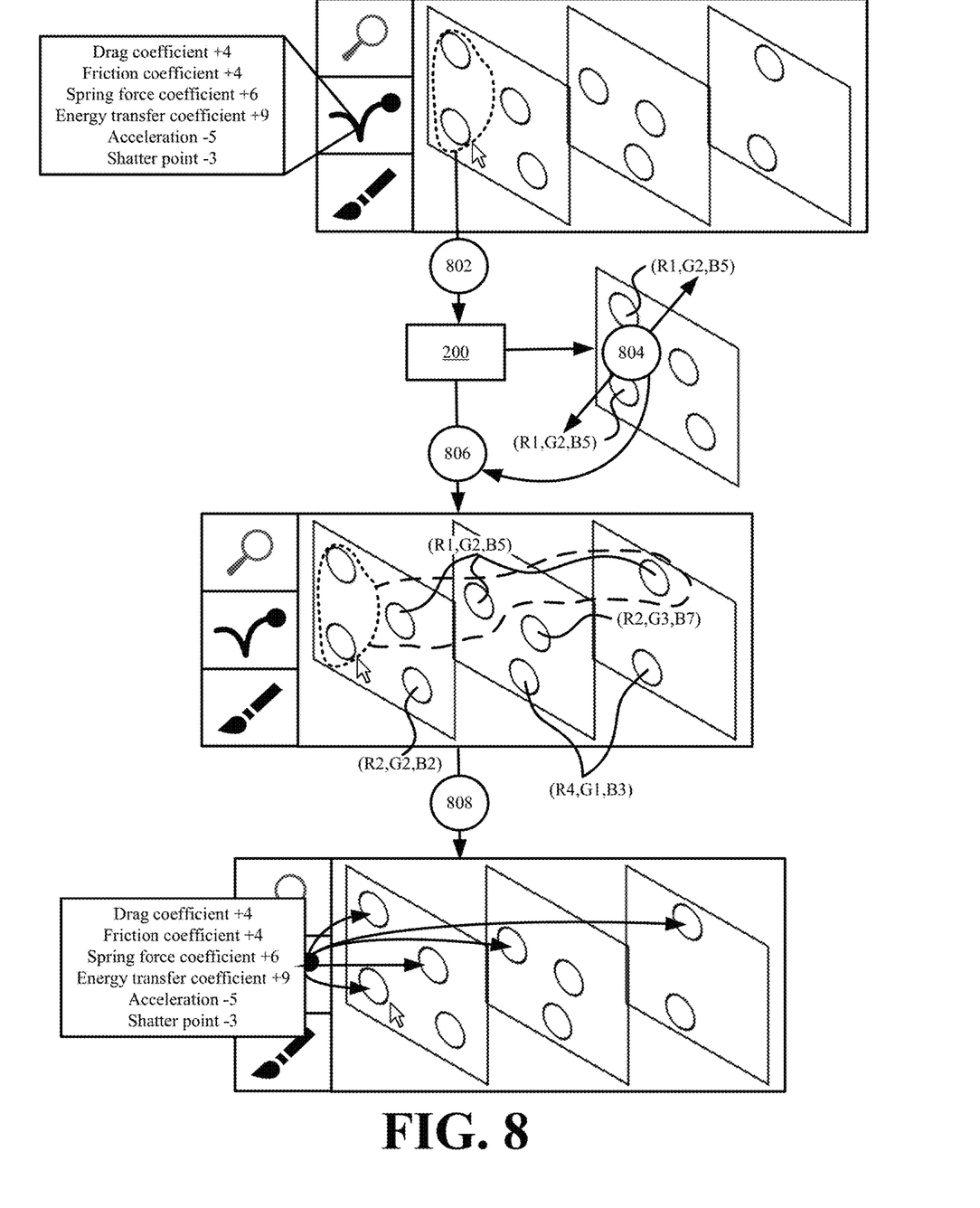
FIG. 8 illustrates an example of the enhanced UI tool for assigning animation physics to points of a point cloud in accordance with some embodiments presented herein.

FIG. 8 illustrates an example of the enhanced UI tool for assigning animation physics to points of a point cloud in accordance with some embodiments presented herein. 3D animation system 200 tracks (at 802) a user selection of a first set of points that are to be assigned a configured set of animation physics.

3D animation system 200 analyzes (at 804) the positional elements and the non-positional elements of the first set of points in the user selection for commonality. Commonality amongst the positional elements of the first set of points may include a repeating pattern or a particular structure that is formed in the arrangement or positioning of the first set of points. Commonality amongst the non-positional elements of the first set of points may include the first set of points having a particular range of color values or the color values varying by a threshold amount across the first set of points.

3D animation system 200 analyzes the positional elements and the non-positional elements of the points that neighbor the user selection, and automatically selects (at 806) a second set of points outside the user selection that have the same commonality found within the first set of points in the user selection. The automatic selection (at 806) may include selecting points behind the first set of points (e.g., at lower depths in the 3D space) that are part of the same feature as the first set of points and selecting surrounding points that have the same positional or non-positional commonality as the user selected first set of points in the same depth or plane.

3D animation system 200 attributes (at 808) the animation physics configured for the UI tool to each point in the first set of points and the automatically selected (at 806) second set of points. Accordingly, the user may perform a rough selection of a particular feature represented by a set of points in the point cloud, and 3D animation system 200 automatically detects other points of the particular feature that receive the same animation physics as the set of points.

Figure 9:
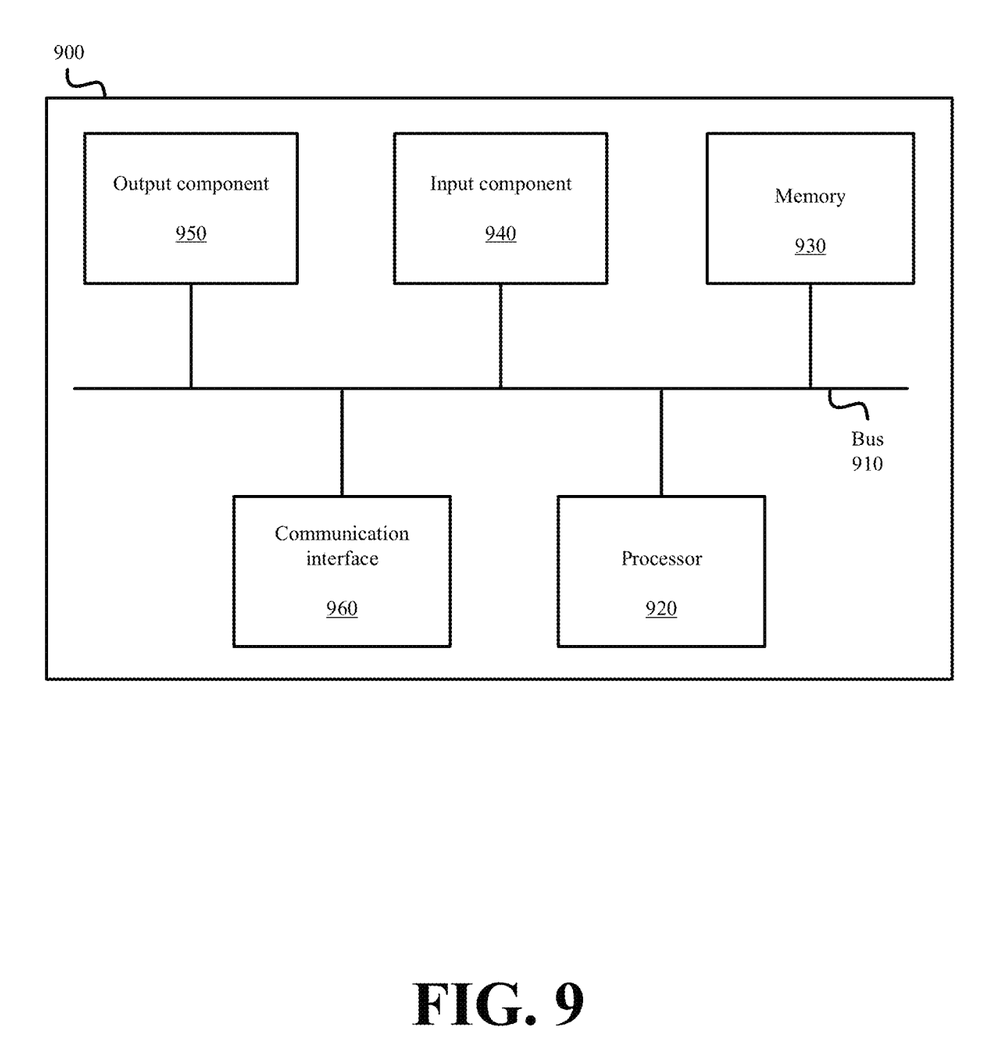
FIG. 9 illustrates example components of one or more devices, according to one or more embodiments described herein.

FIG. 9 is a diagram of example components of device 900. Device 900 may be used to implement one or more of the tools, devices, or systems described above (e.g., 3D animation system 200). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   receiving a plurality of points that are defined with positions in a three-dimensional (3D) space and with visual characteristics;
   analyzing one or more of the positions and the visual characteristics of the plurality of points;
   classifying a set of points from the plurality of points based on a commonality in the positions or the visual characteristics of the set of points being associated with a particular classification;
   mapping a set of animation physics defined for the particular classification to each point of the set of points;
   changing a visualization of the set of points to differ from a visualization of other points of the plurality of points in response to an activation of a tool for editing or visualizing animation physics, wherein changing the visualization comprises:
      presenting the plurality of points in a display window; and
      modifying the visual characteristics of the set of points to identify the set of animation physics that are mapped to the set of points; and
   animating the set of points based on the set of animation physics generating an effect in response to a force that is applied to the plurality of points.

2. The method of claim 1, wherein classifying the set of points comprises:
   determining that a density or distribution of the set of points in the 3D space corresponds to a density or distribution that is associated with the particular classification.

3. The method of claim 1, wherein classifying the set of points comprises:
   determining that the positions of the set of points corresponds to a structural pattern associated with the particular classification.

4. The method of claim 1, wherein animating the set of points comprises:
   generating a first visualization in response to rendering the plurality of points at first positions; and
   generating a second visualization in response to rendering the set of points at different second positions determined from the effect.

5. The method of claim 1, wherein mapping the set of animation physics comprises:
   defining two or more of a spring coefficient, friction coefficient, drag coefficient, energy coefficient, and acceleration for the set of points based on the particular classification.

6. The method of claim 1, wherein animating the set of points comprises:
   adjusting a first effect that the force has on the positions of the set of points based on the set of animation physics; and
   repositioning the set of points in the 3D space based on a second effect that results from adjusting the first effect.

7. The method of claim 1, wherein animating the set of points comprises:
   adjusting a speed by which the set of points move in response to the force based on values specified for the set of animation physics.

8. The method of claim 1, wherein mapping the set of animation physics comprises:
   specifying an amount of force that is required to initiate a movement of the set of points and that is consistent with an amount of force that is required to initiate a movement of an object with the particular classification.

9. The method of claim 1, wherein animating the set of points comprises:
   detecting a collision with an object in the 3D space; and
   determining an amount of the force to transfer to the object based on the set of animation physics.

10. The method of claim 1 further comprising:
receiving a plurality of 3D objects comprising labels identifying each 3D object of the plurality of 3D objects;
analyzing the plurality of 3D objects for differentiating commonality amongst primitives of each 3D object of the plurality of 3D objects; and
defining a model with a plurality of classifications that are derived from the labels and with the differentiating commonality of one or more 3D objects being associated with a different classification from the plurality of classifications.

11. The method of claim 10, wherein classifying the plurality of points comprises:
determining that the commonality in the positions or the visual characteristics of the sets of points matches by a threshold amount to the differentiating commonality that is associated with the particular classification in the model.

12. The method of claim 10 further comprising:
determining different sets of animation physics for the plurality of classifications based on an analysis of a motion of a 3D object represented by each classification of the plurality of classifications in one or more videos or animations of that 3D object; and
associating each of the different sets of animation physics to a corresponding classification in the model.

13. The method of claim 1, wherein mapping the set of animation physics comprises:
defining one or more elements of each point from the set of points with the set of animation physics.

14. The method of claim 1, wherein mapping the set of animation physics comprises:
defining an index value for each point of the sets of points that links to a definition of the set of animation physics.

15. The method of claim 1, wherein changing the visualization further comprises:
color coding the plurality of points to present points that are mapped with the same animation physics with a common color.

16. The method of claim 1 further comprising:
defining custom animation physics;
receiving a user input that selects a group of points from the plurality of points;
expanding the group of points to include one or more points that are not selected with the user input and that include a positional or visual characteristic commonality with the group of points; and
assigning the custom animation physics to the group of points and the one or more points.

17. The method of claim 1 further comprising:
receiving a user input that specifies one or more parameters of an object;
converting the one or more parameters into values for custom animation physics; and
assigning the custom animation physics to a group of points from the plurality of points.

18. The method of claim 17, wherein the one or more parameters of the object correspond to physical properties of the object, and wherein the values for the custom animation physics correspond the coefficient values associated with physics.

19. A three-dimensional (3D) animation system comprising:
one or more hardware processors configured to:
receive a plurality of points that are defined with positions in a 3D space and with visual characteristics;
analyze one or more of the positions and the visual characteristics of the plurality of points;
classify a set of points from the plurality of points based on a commonality in the positions or the visual characteristics of the set of points being associated with a particular classification;
map a set of animation physics defined for the particular classification to each point of the set of points;
change a visualization of the set of points to differ from a visualization of other points of the plurality of points in response to an activation of a tool for editing or visualizing animation physics, wherein changing the visualization comprises:
presenting the plurality of points in a display window; and
modifying the visual characteristics of the set of points to identify the set of animation physics that are mapped to the set of points; and
animate the set of points based on the set of animation physics generating an effect in response to a force that is applied to the plurality of points.

20. A non-transitory computer-readable medium storing instructions that, when executed by one or more processors of a three-dimensional (3D) animation system, cause the 3D animation system to perform operations comprising:
receiving a plurality of points that are defined with positions in a three-dimensional (3D) space and with visual characteristics;
analyzing one or more of the positions and the visual characteristics of the plurality of points;
classifying a set of points from the plurality of points based on a commonality in the positions or the visual characteristics of the set of points being associated with a particular classification;
mapping a set of animation physics defined for the particular classification to each point of the set of points;
changing a visualization of the set of points to differ from a visualization of other points of the plurality of points in response to an activation of a tool for editing or visualizing animation physics, wherein changing the visualization comprises:
presenting the plurality of points in a display window; and
modifying the visual characteristics of the set of points to identify the set of animation physics that are mapped to the set of points; and
animating the set of points based on the set of animation physics generating an effect in response to a force that is applied to the plurality of points.

* * * * *